US006256054B1

(12) United States Patent
Maekawa

(10) Patent No.: US 6,256,054 B1
(45) Date of Patent: Jul. 3, 2001

(54) PHOTO RECEPTOR BELT EDGE DETECTION APPARATUS

(75) Inventor: Takeshi Maekawa, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/433,419

(22) Filed: Nov. 4, 1999

(30) Foreign Application Priority Data

Nov. 6, 1998 (JP) .................................................. 10-315736

(51) Int. Cl.[7] ........................................................ B41J 2/47
(52) U.S. Cl. ........................... 347/234; 347/116; 347/248
(58) Field of Search .................................. 347/116, 234, 347/235, 248, 250

(56) References Cited

U.S. PATENT DOCUMENTS

| 5,300,961 | * | 4/1994 | Corona et al. ......................... 347/116 |
| 5,896,158 | * | 4/1999 | Brenner, Jr. et al. ................. 347/116 |
| 5,905,519 | * | 5/1999 | Brenner, Jr. et al. ................. 347/116 |

FOREIGN PATENT DOCUMENTS

| 63-149670 | 6/1988 | (JP) . |
| 4-16969 | 1/1992 | (JP) . |
| 4-274467 | 9/1992 | (JP) . |
| 4-303859 | 10/1992 | (JP) . |
| 5-119574 | 5/1993 | (JP) . |
| 8-290611 | 11/1996 | (JP) . |

OTHER PUBLICATIONS

Japanese Office Action issued Nov. 24, 1999 in a related application and English translation of relevant portions.

* cited by examiner

Primary Examiner—N. Le
Assistant Examiner—Hai C. Pham
(74) Attorney, Agent, or Firm—Ostrolenk, Faber, Gerb & Soffen, LLP

(57) ABSTRACT

A photo receptor belt edge detection apparatus by which out-of-alignment of color images which arises from displacement of scanning start positions for different colors on a photo receptor belt of a color image formation apparatus can be eliminated with a simple construction to allow superposition of color images to be performed with a high degree of accuracy is disclosed. A plurality of beam detector signal generation elements output beam detector signals representative of starting of scanning when corresponding laser beams are received. After an arbitrary interval of time after the beam detector signals are received, light emitting diodes of each of belt edge detecting LED devices are successively energized to emit light in a main scanning direction. Belt edge detectors output detection signals till timings at which the light from the belt edge detecting LED devices is intercepted by an edge of a photo receptor belt. In response to the detection signals, video clock signals are outputted in synchronism with falling edges of the detection signals. Laser diodes serving as exposure light sources are energized to emit light in response to video signals synchronized with the video clock signals.

15 Claims, 7 Drawing Sheets

M

PHOTO RECEPTOR BELT EDGE DETECTION APPARATUS

BACKGROUND OF THE INVENTION

1. Field of the Invention

The present invention relates to a color image formation apparatus which exposes a photo receptor belt to light from a plurality of exposure light sources to form a color image of a plurality of colors superposed with each other, and more particularly to a photo receptor belt edge detection apparatus for use with a color image formation apparatus of the type mentioned which detects the position of an edge of the photo receptor belt and eliminates a displacement of a light exposure scanning start position on the semiconductor belt to correct the light exposure scanning start position.

2. Description of the Related Art

Conventionally, an image formation apparatus which employs an electrophotographic system is used in printers, copying machines, facsimile apparatus and other like apparatus. A photo receptor member principally with which an image formation process is performed is formed either as a drum type photo receptor member or as a belt type photosensitive member. A color image formation apparatus which prints in multiple colors frequently uses a photosensitive member in the form of a belt, that is, a photo receptor belt in order to facilitate superposition of a plurality of images of different colors on the photosensitive member.

In a color image formation apparatus which employs a photo receptor belt, it is important to adjust the timing of the writing operation so the start positions on the photo receptor belt in the scanning direction is the same for each color image. Otherwise, there will be misalignment of the color images, and the ultimate printed composite color image will be degraded. One way to adjust the timing is to use belt edge position detectors for detecting starting of scanning of laser beams for exposure. The detectors are disposed on the rear face side in the proximity of an edge of the photo receptor belt on the laser scanning starting side such that signals for providing timings at which scanning of image signals are to be started on the photo receptor belt at timings at which the exposure laser beams are intercepted by the photo receptor belt after the exposure laser beams pass the belt edge position detector are outputted from the belt edge position detectors. A color image formation apparatus of the type described is disclosed, for example, in Japanese Patent Laid-Open No. Hei 4-274467.

In the conventional color image formation apparatus, however, the laser beams must be irradiated upon locations outside an image writing range on the photo receptor belt. Therefore, where the color image formation apparatus has such a large size that it handles a paper sheet of the A3 size or the like, it is very difficult to form the laser units for it.

In order to allow a laser beam to be irradiated upon a location outside an image writing range, some color image formation apparatus employs an additional mirror.

However, in order to allow a laser beam to be irradiated directly upon a location outside an image writing range without using an additional mirror, a special lens must be provided. In order to irradiate a laser beam directly upon a location outside an image writing range, a corner portion M of a reflecting surface of a polygon mirror as indicated in FIG. 7 is used. However, reflected light from the corner portion of the polygon mirror is liable to have a low intensity. The special lens mentioned above is a lens designed to restrict the diameter of the laser beam and direct the laser beam so as to be irradiated upon the belt edge position detector at a sufficiently high intensity.

The conventional color image formation apparatus described above is disadvantageous in that it is complicated in structure, difficult to produce and high in production cost because it employs a special lens.

Further, even if it is tried to start writing at a fixed position from an edge of the photo receptor belt after the edge is detected on the basis of timing signals from a clock generator, the writing start positions for the different colors may be displaced from each other by an amount corresponding to one clock pulse unless video clock signals for the different colors are synchronized with each other. Consequently, the conventional color image formation apparatus described above is disadvantageous also in that out-of-alignment of color images may not be eliminated and a color image of a high quality cannot be obtained.

SUMMARY OF THE INVENTION

It is an object of the present invention to provide a photo receptor belt edge detection apparatus by which out-of-alignment of color images which arises from displacement of scanning start positions for different colors on a photo receptor belt can be eliminated with a simple construction to allow superposition of color images to be performed with a high degree of accuracy.

The present invention provides a photo receptor belt edge detection apparatus for a color image formation apparatus wherein a traveling photo receptor belt is exposed to scanning light beams from a plurality of exposure light sources of different image formation units for different colors in a direction perpendicular to the traveling direction of the belt to form color separation images which are superposed on the photo receptor belt to form a composite color image. The invention employs a plurality of belt edge detecting light sources for each of the color separation image formation units, and a plurality of belt edge detecting light sensor sections for detecting positions of an edge of the photo receptor belt as light beams emitted from the respective belt edge detecting light sources are intercepted by the photo receptor belt. The resulting edge detection signals, are used to start the riding of the image data for the respective color separation images after a fixed interval of time following receipt of the corresponding belt edge detection signal.

Preferably, each of the image formation units for the different colors includes clock synchronization means for synchronizing a video clock signal to be used to output image data with the detection signal from a corresponding one of the belt edge detecting light sensor sections.

Preferably, the belt edge detecting light sources and the belt edge detecting light sensor elements are disposed in an opposing relationship to each other on extension lines of scanning lines of the scanning light beams of the exposure light sources in the image formation units for the different colors. Further preferably, the belt edge detecting light sources and the belt edge detecting light sensor sections are disposed in an opposing relationship to each other across the photo receptor belt such that opposing faces thereof extend over both of an inner region on the inner side with respect to the edge of the photo receptor belt and an outer region on the outer side with respect to the edge of the photo receptor belt. Further, each of the belt edge detecting light sources may include a plurality of light emitting diodes disposed in a main scanning direction which is an exposure light scanning direction of a corresponding one of the exposure light sources, and the light emitting diodes in each of the belt edge detecting light sources successively emit light. Furthermore, each of the belt edge detecting light sensor sections may include a photodiode which receives the light successively emitted from the plurality light emitting diodes to detect the position of the edge of the photo receptor belt. Alternatively, each of the belt edge detecting light sensor sections may include a CCD sensor including a plurality of CCD sensors and receives, by means of the plurality of CCD sensors, the light successively emitted from the plurality of light emitting diodes to detect the position of the edge of the photo receptor belt.

With the photo receptor belt edge detection apparatus, even if the photo receptor belt inadvertently moves in the laterally leftward or rightward direction, writing of video signals for the different colors on the photo receptor belt is started normally at the same distance from the edge of the photo receptor belt for the different colors. Consequently, the writing starting positions for the different colors are not relatively displaced, and possible misalignment of color images when the color images of the different colors are superposed with each other can be eliminated. Therefore, the photo receptor belt edge detection apparatus is advantageous in that a color image of a good quality can be obtained.

Further, different from the conventional photo receptor belt edge detection apparatus described hereinabove, the photo receptor belt edge detection apparatus of the present invention eliminates the necessity for irradiating laser beams upon locations outside the image writing range on the photo receptor belt, and consequently, it eliminates the necessity for a special lens or a like element. Consequently, the photo receptor belt edge detection apparatus of the present invention is advantageous also in that it is simple in structure and easy to produce and allows reduction of the production cost.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
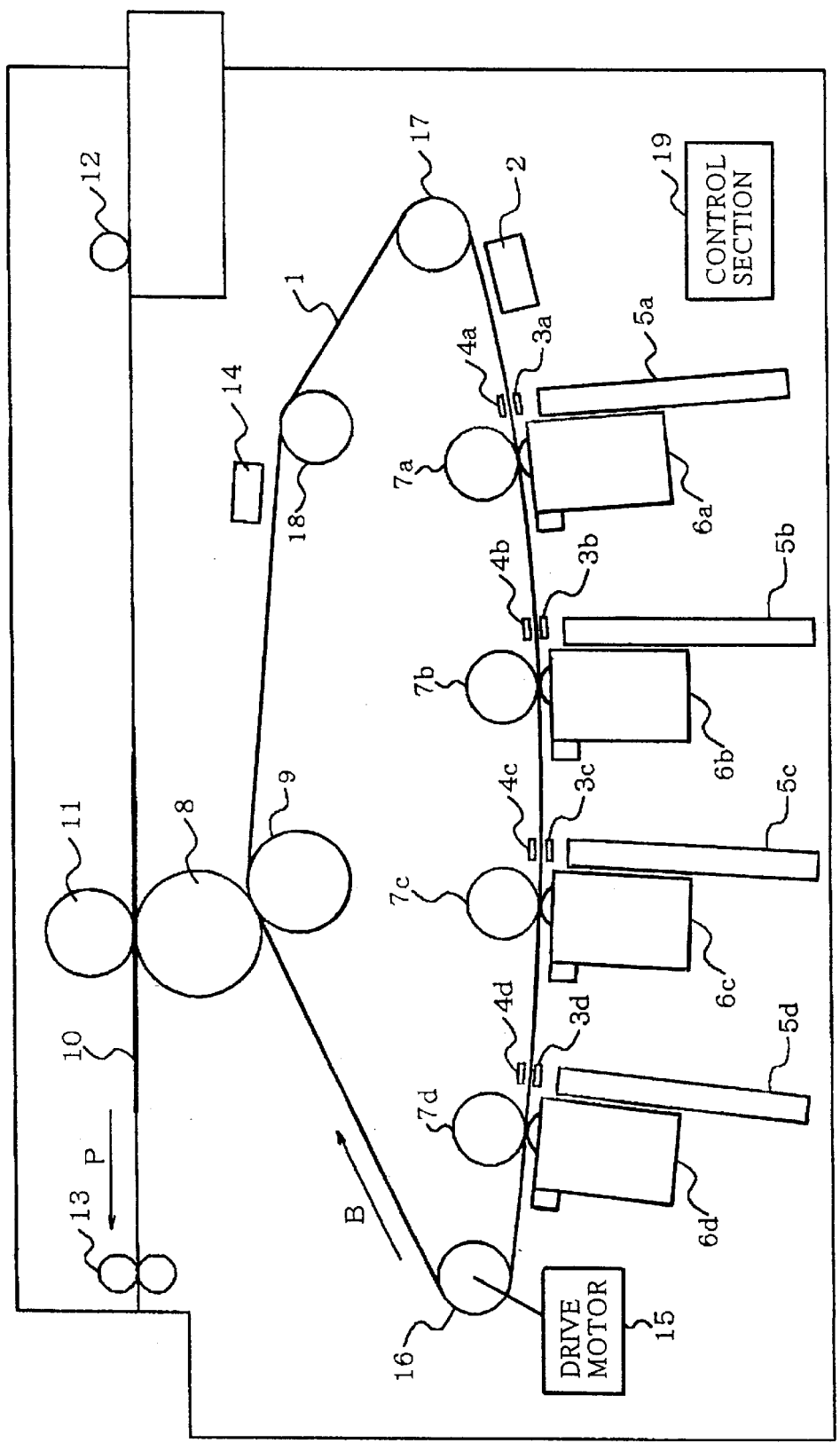
FIG. 1 is a schematic view showing a construction of a color image formation apparatus in which a photo receptor belt edge detection apparatus to which the present invention is applied is incorporated.

Referring to FIG. 1, there is shown a color image formation apparatus in which a photo receptor belt edge detection apparatus according to the present invention is incorporated. The color image formation apparatus includes a photo receptor belt 1 which is in the form of an endless belt. The photo receptor belt 1 travels in the direction indicated by an arrow mark B. In order to form a full color image by superposing images of four different colors of yellow, magenta, cyan and black on the photo receptor belt 1, four image formation units described below are incorporated in the color image formation apparatus.

Four belt edge position detecting LED (Light Emitting Diode) devices 3a, 3b, 3c and 3c corresponding to the four colors of yellow, magenta, cyan and black are disposed in a spaced relationship from each other along one side edge of the photo receptor belt 1. Four belt edge position detectors 4a, 4b, 4c and 4d corresponding to the four belt edge position detecting LED devices 3a, 3b, 3c and 3c, respectively, are disposed in a similar manner. The belt edge position detecting LED devices 3a, 3b, 3c and 3d and the belt edge position detectors 4a, 4b, 4c and 4d are paired with each other, respectively, and individually detect the positions of the one edge of the photo receptor belt 1.

Four laser units 5a, 5b, 5c and 5d serving as exposure light sources of the four colors individually irradiate exposure laser beams upon the photo receptor belt 1 to form desired electrostatic latent images on the photo receptor belt 1. The electrostatic latent images formed on the photo receptor belt 1 are developed with toner powder by four development units 6a, 6b, 6c and 6d for the four colors, respectively. Four development backup rollers 7a, 7b, 7c and 7d are disposed in an opposing relationship to the development units 6a, 6b, 6c and 6d, respectively.

A full color image obtained by the development with the toners of the four colors is transferred from the photo receptor belt 1 to a transfer roller 8. A transfer backup roller 9 is disposed in an opposing relationship to the transfer roller 8. The image on the transfer roller 8 is further transferred to a paper sheet 10 and then fixed to the paper sheet 10 by the fixing roller 11. The paper sheet 10 is supplied from a paper supply section 12 into the apparatus and discharged from a discharging section 13 to the outside of the apparatus. An arrow mark P denotes the direction in which the paper sheet 10 travels. An eraser 14 removes charge of the photo receptor belt 1. The discharged photo receptor belt 1 advances into a next image formation process.

The photo receptor belt 1 is driven to rotate by a drive motor 15 through a driving roller 16, a steering roller 17 and a tension roller 18. A control section 19 controls the various units in the apparatus.

Figure 2:
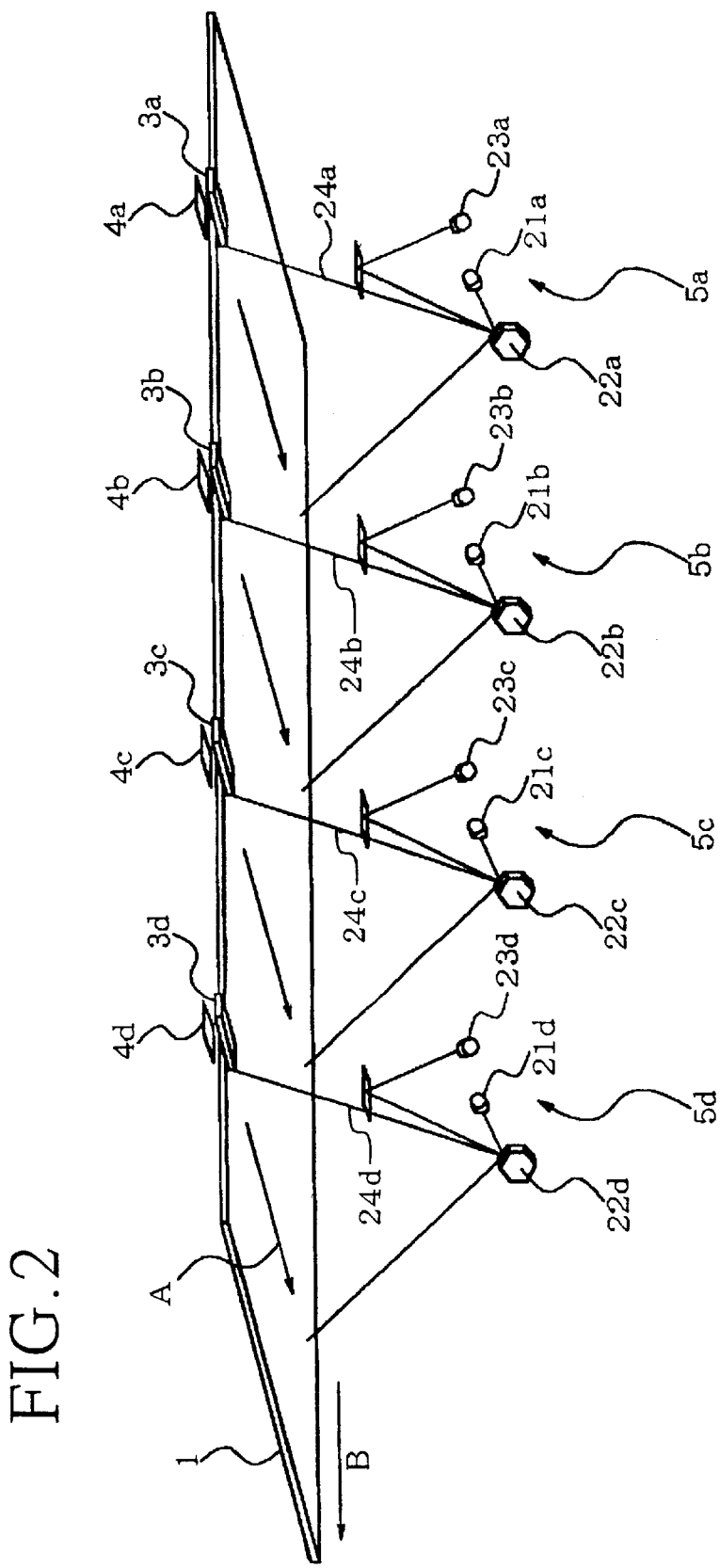
FIG. 2 is a schematic view showing the photo receptor belt edge detection apparatus to which the present invention is applied.

FIG. 2 shows the photo receptor belt edge detection apparatus incorporated in the color image formation apparatus described above with reference to FIG. 1. Referring to FIG. 2, the photo receptor belt 1 is a flexible belt having a photoconductive material applied to or vapor deposited on the surface thereof and is circulated in the direction indicated by an arrow mark B by the drive motor 15 shown in FIG. 1. The laser units 5a, 5b, 5c and 5d include laser diodes 21a, 21b, 21c and 21d, polygon mirrors 22a, 22b, 22c and 22d, BD (Beam Detector) signal generation elements 23a, 23b, 23c and 23d, and f-θ lenses (not shown), respectively. The laser unit 5a is provided for yellow; the laser unit 5b for magenta; the laser unit 5c for cyan; and the laser unit 5d for black.

Exposure laser beams 24a, 24b, 24c and 24d are emitted from the laser diodes 21a to 21d and reflected by the rotating polygon mirrors 22a to 22d, respectively, so that they are scanned each in the direction of an arrow mark A on the photo receptor belt 1.

The belt edge detectors 4a to 4d are formed from photodiodes or like elements and receive LED light beams (not shown) emitted successively from the corresponding belt edge detecting LED devices 3a to 3d each in the direction indicated by an arrow mark A.

As seen from FIG. 2, the belt edge detecting LED devices 3a to 3d and the belt edge detectors 4a to 4d are disposed in an opposing relationship to each other on extension lines of the scanning lines of the scanning light beams of the laser diodes 21a to 21d serving as exposure light sources in the image formation units for the individual colors, respectively.

Figure 3:
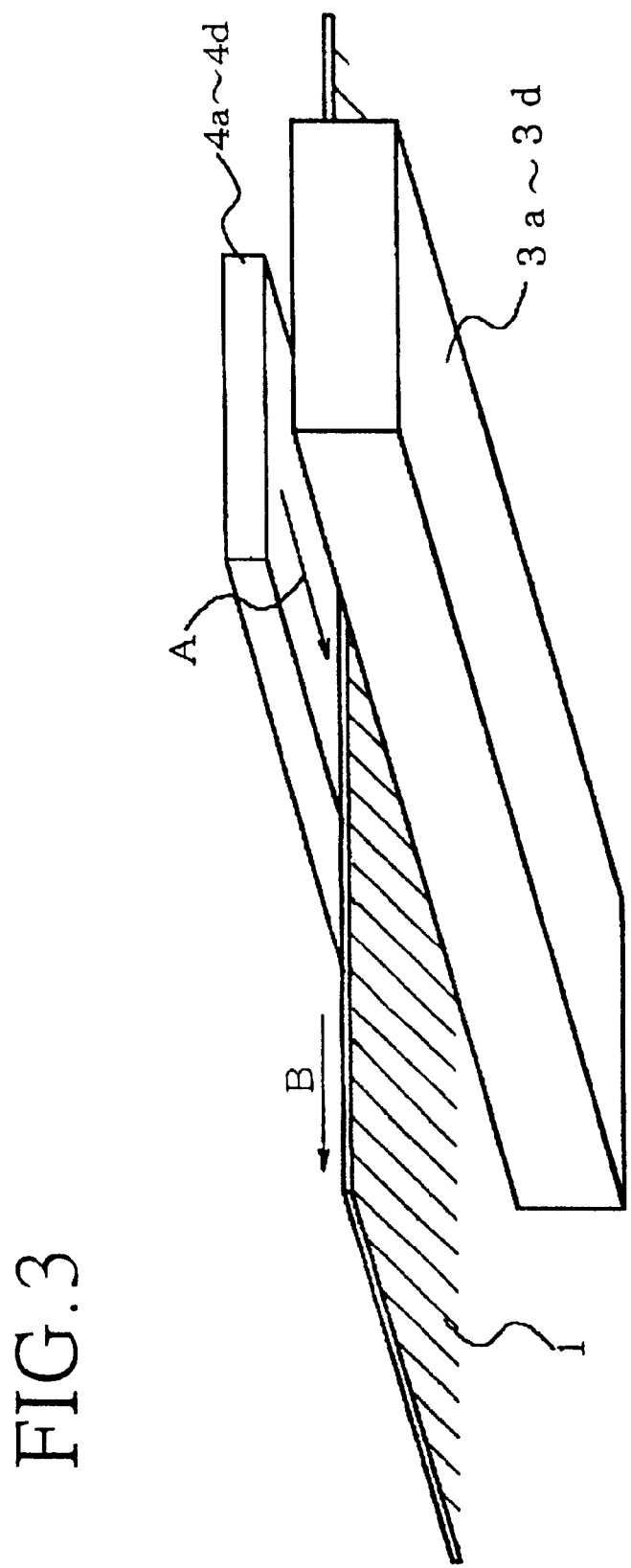
FIG. 3 is a detailed perspective view showing a positional relationship of a belt edge position detecting LED device and a belt edge position detector with respect to a photoelectric belt of the color image formation apparatus of FIG. 1.

FIG. 3 particularly shows a positional relationship of the belt edge detecting LED devices 3a to 3d and the belt edge detectors 4a to 4d to the photo receptor belt 1. The belt edge detecting LED devices 3a to 3d and the belt edge detectors 4a to 4d are disposed in an opposing relationship to each other across the photo receptor belt 1 such that the opposing faces thereof extend over both of an inner region on the inner side with respect to the edge of the photo receptor belt 1 and an outer region on the outer side with respect to the edge of the photo receptor belt 1.

Each of the belt edge detecting LED devices 3a to 3d includes a plurality of light emitting diodes arranged in the main scanning direction. The light emitting diodes successively emit light in the direction of the arrow mark A beginning with the outermost one of them. Meanwhile, the belt edge detectors 4a to 4d are formed from photodiodes. When the plurality of light emitting diodes successively emit light, for those diodes in a first group for which the light is intercepted by the edge of the photo receptor belt 1 the light is not detected by the photodiode of a corresponding one of the belt edge detectors 4a to 4d. Similarly for those diodes a second group for which the light is not intercepted by the edge of belt 1, light will be detected by the associated photodiode. When light from an activated diode is not detected, then the belt edge detector 4a, 4b, 4c or 4d thereupon outputs a detection signal.

Figure 4:
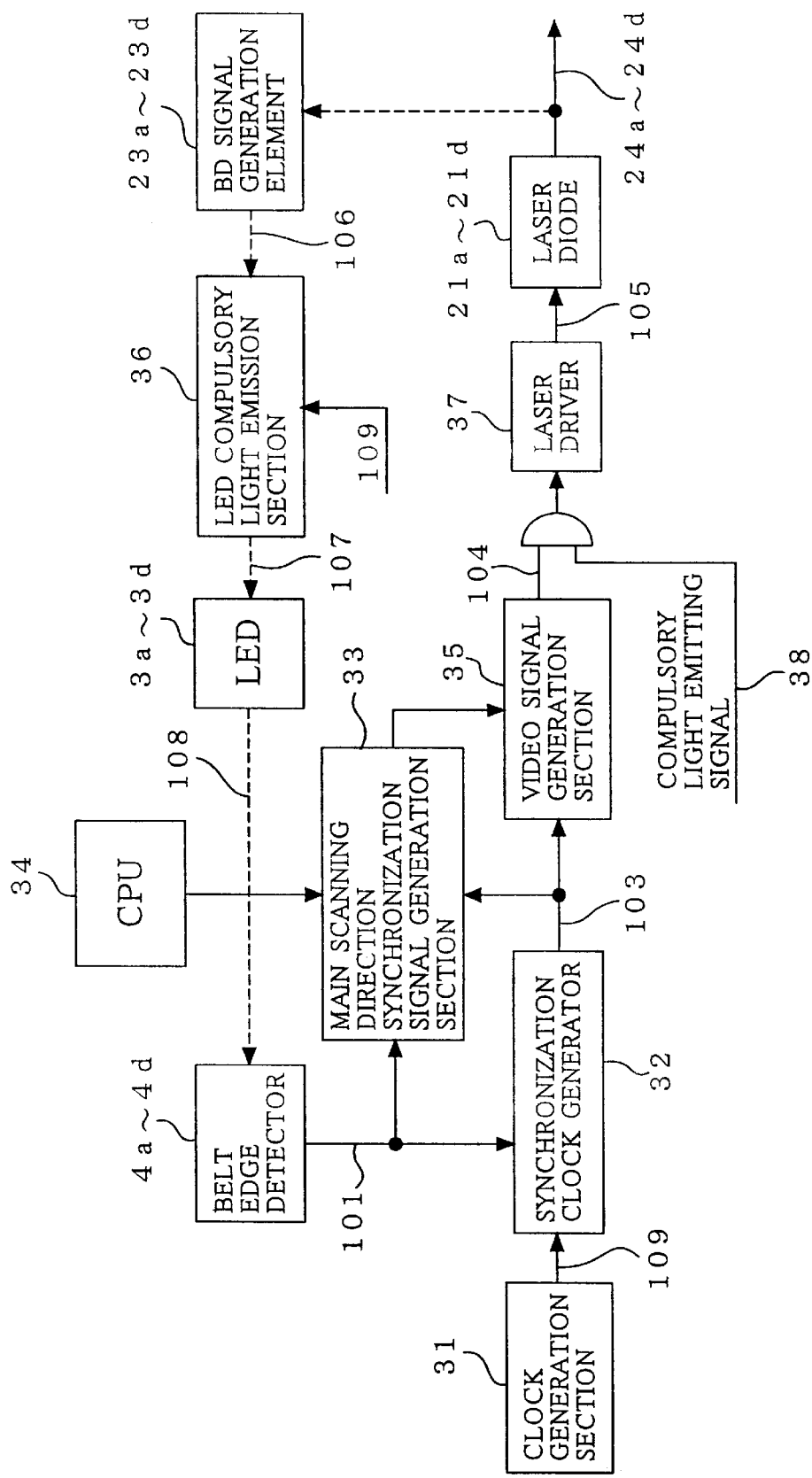
FIG. 4 is a block diagram showing flows of signals in and around a control section of the photo receptor belt edge detection apparatus of FIG. 2.

FIG. 4 illustrates flows of signals in and around the control section 19 shown in FIG. 1. Referring to FIG. 4, the control section 19 shown includes a clock generation section 31, a synchronization clock generator 32, a main scanning direction synchronization signal generation section 33, a central processing unit (CPU) 34, a video signal generation section 35, an LED compulsory light emission section 36 and a laser driver 37.

The clock generation section 31 which may include a quartz oscillator etc., a synchronously outputs a clock signal to be used for controlling the writing of video data. The belt edge detectors 4a to 4d individually detect the light of the belt edge detecting LED devices 3a to 3d as described above to detect the edge of the photo receptor belt 1 and output detection signals. The synchronization clock generator 32 receives the detection signals outputted from the belt edge detectors 4a to 4d as trigger signals and generates video clock signals synchronized with the trigger signals.

The main scanning direction synchronization signal generation section 33 which may include counters etc., receives the trigger signals and generates main scanning direction synchronization signals synchronized with a clock signal after arbitrary intervals of time set from the CPU 34. The video signal generation section 35 outputs video data signals in synchronism with the video clock signals. A compulsory light emitting signal 38 is a signal for compulsorily causing the laser diodes 21a to 21d to emit light when the exposure laser beams 24a to 24d are to scan on the BD signal generation elements 23a to 23d so that the BD signal generation elements 23a to 23d may detect the exposure laser beams 24a to 24d, respectively.

The LED compulsory light emission section 36 receives BD signals from the BD signal generation elements 23a to 23d and causes the belt edge detecting LED devices 3a to 3d to be successively lit in the direction of an arrow mark A after an arbitrary interval of time. The laser driver 37 receives the video signals from the video signal generation section 35 and causes the laser diodes 21a to 21d to emit light so that the photo receptor belt 1 is exposed with the light to form electrostatic latent images on the photo receptor belt 1.

Subsequently, operation of the photo receptor belt edge detection apparatus described above is described with reference to FIGS. 4 and 5.

The exposure laser beams 24a to 24d outputted from the laser diodes 21a to 21d for the colors of yellow, magenta, cyan and black are reflected by the polygon mirrors 22a to 22d, respectively, and restricted in beam diameter thereof by the f-θ lenses not shown and then scanned in the direction indicated by the arrow mark A on the photo receptor belt 1.

Here, when the exposure laser beams 24a to 24d are irradiated upon the BD signal generation elements 23a to 23d immediately before the exposure laser beams 24a to 24d are scanned on the photo receptor belt 1, the BD signal generation elements 23a to 23d individually outputs BD signals 106 which represent starting of scanning. The LED compulsory light emission section 36 receives the BD signals 106 and outputs LED ON signals 107 after an arbitrary interval of time $t_3$ so that the belt edge detecting LED devices 3a to 3d may be successively lit in the direction of the arrow mark A in synchronism with the clock signal 109.

Each of the belt edge detectors 4a to 4d outputs a detector output 101 for a time after a timing at which LED light 108 starts scanning on a corresponding one of the belt edge detectors 4a to 4d till another timing at which the LED light 108 is intercepted by the photo receptor belt 1. When the detector output 101 is detected, the synchronization clock generator 32 synchronizes the clock signal 109 outputted from the clock generation section 31 with a falling edge of the detector output 101 to produce a video clock signal 103 and outputs the video clock signal 103 in order to adjust the writing start position on the photo receptor belt 1 with a high degree of accuracy. Simultaneously, the main scanning direction synchronization signal generation section 33 counts the number of clocks of the video clock signal 103 using a counter and outputs a main scanning direction synchronization signal 102 after an arbitrary interval of time ($t_1$ seconds) set by the CPU 34 from the falling edge of the detector output 101. The symbol toss in FIG. 5 denotes an output delay of the synchronization clock generator 32.

Video data stored in the video signal generation section 35 are outputted as a video signal 104 from the video signal generation section 35 in synchronism with the video clock signal 103 after $t_2$ seconds from a falling edge of the main scanning direction synchronization signal 102. When the video signal 104 is received, the laser driver 37 causes a corresponding one of the laser diodes 21a to 21d to emit light in response to a laser ON signal 105 so that the photo receptor belt 1 is exposed to the light from the corresponding one of the laser diodes 21a to 21d to form an electrostatic latent image thereon.

Figure 5:
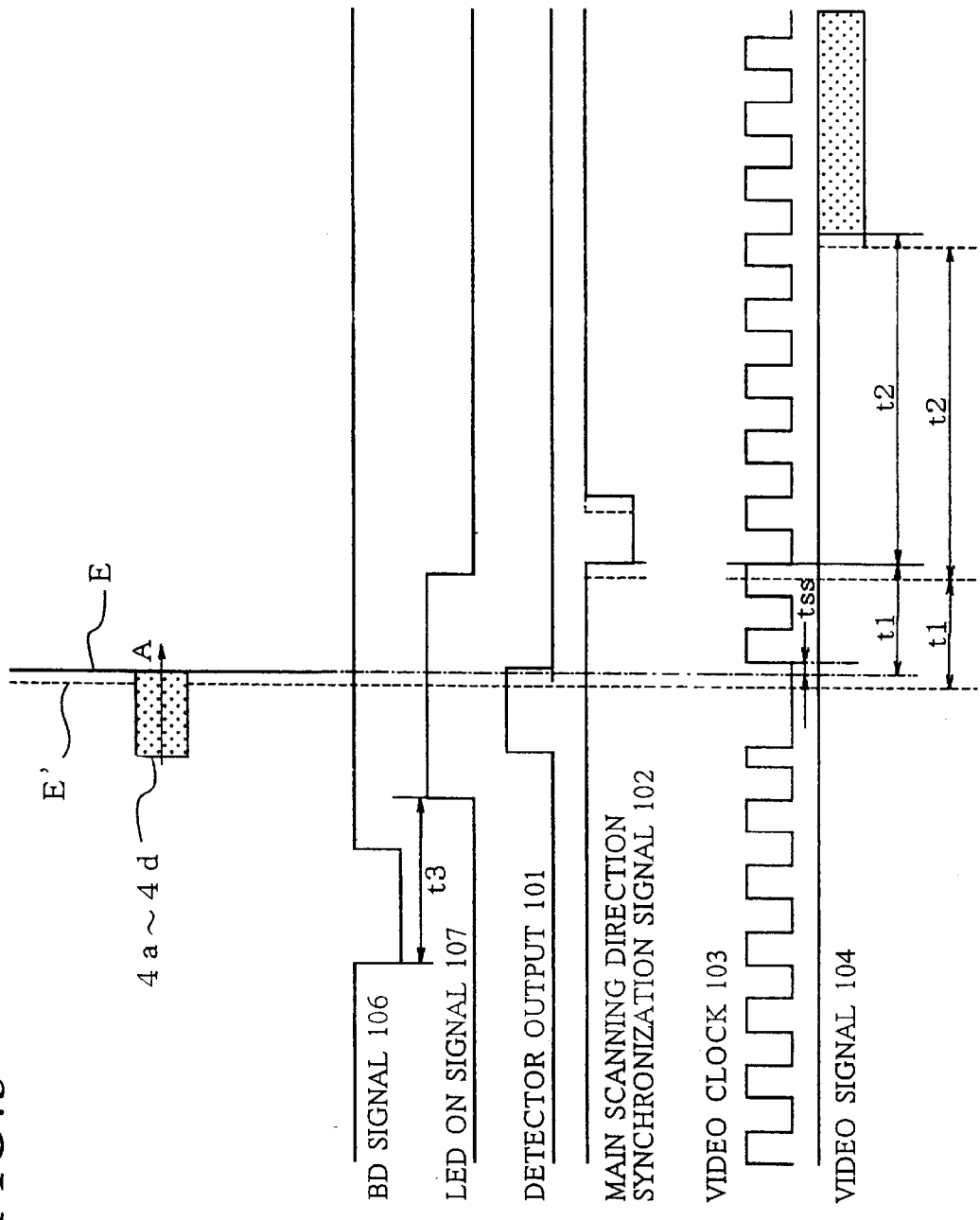
FIG. 5 is a timing chart illustrating operation of the photo receptor belt edge detection apparatus of FIG. 2.

Here, if the position of the edge of the photo receptor belt 1 moves from a position indicated by a solid line E to another position indicated by a broken line E' in FIG. 5, then also the detector output 101 falls at the position of the broken line E', and also the signals which depend upon the detector output 101 are outputted at respective shifted time positions as seen from broken lines in FIG. 5 similarly.

Figure 6:
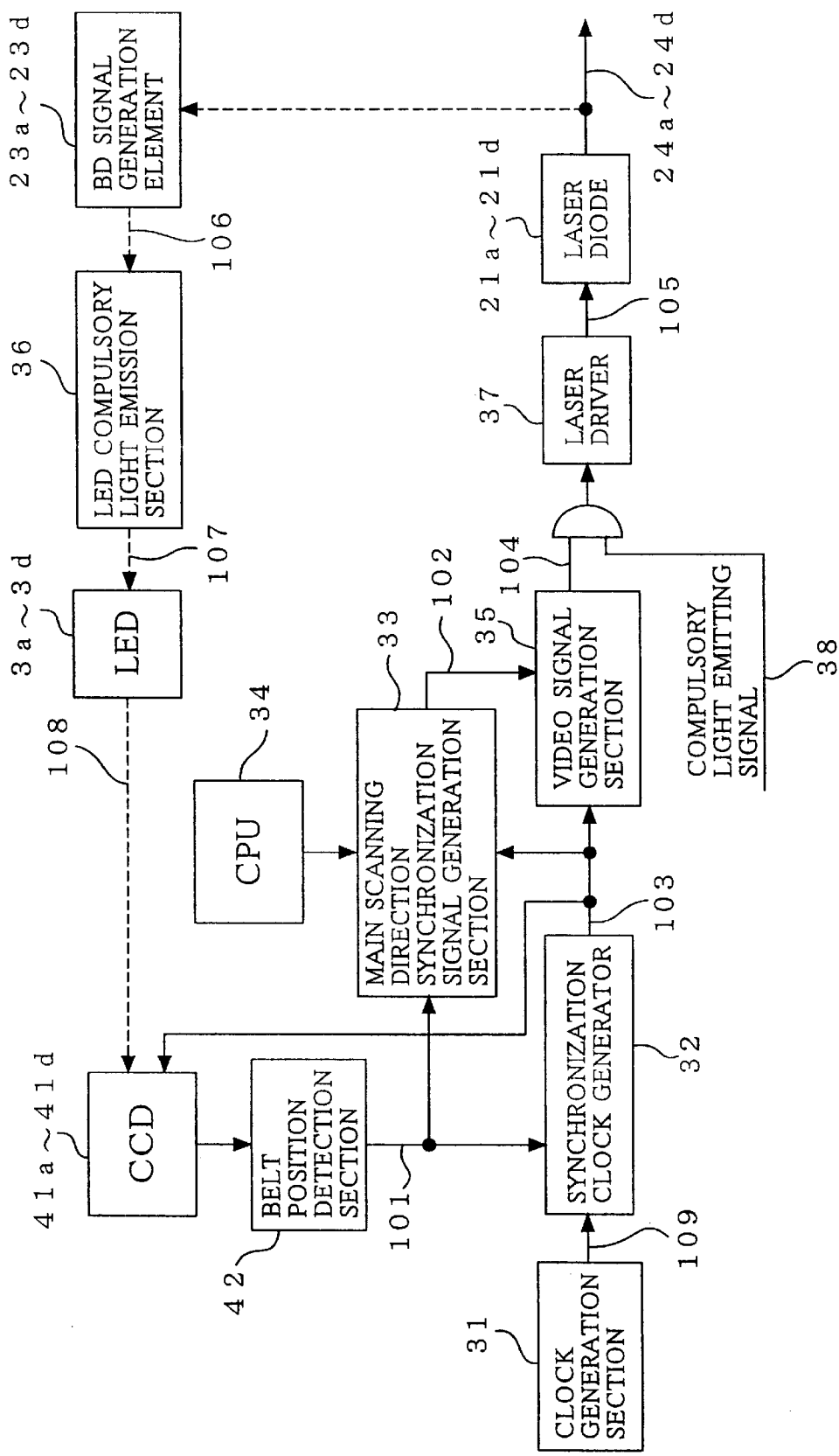
FIG. 6 is a block diagram illustrating flows of signals in and around the control section of a modification to the photo receptor belt edge detection apparatus of FIG. 2.
Figure 7:
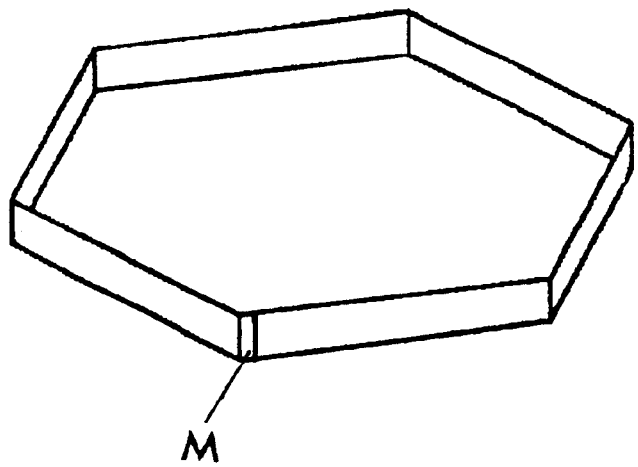
FIG. 7 is a perspective view of a polygon mirror employed in a conventional belt edge position detector.

FIG. 6 shows flows of signals in a modification to the photo receptor belt edge detection apparatus of FIG. 2. The modified photo receptor belt edge detection apparatus is different from that described hereinabove with reference to FIG. 4 in that it includes four CCD (Charge Coupled Device) sensors 41a to 41d in place of the above-described belt edge detectors 4a to 4d formed from photodiodes and additionally includes a belt position detection section 42. Each of the CCD sensors 41a to 41d includes a plurality of CCDs arranged in the direction indicated by an arrow mark A in FIG. 2 (in the main scanning direction). The CCD sensors 41a to 41d are located, similarly to the belt edge detectors 4a to 4d described hereinabove with reference to FIG. 4, in an opposing relationship to the belt edge detecting LED devices 3a to 3d across the photo receptor belt 1 such that the opposing faces thereof extend over both of an inner region on the inner side with respect to the edge of the photo receptor belt 1 and an outer region on the outer side with respect to the edge of the photo receptor belt 1.

Each of the CCD sensors 41a to 41d receives, by means of a set of CCDs thereof, light beams successively emitted from a plurality of light emitting diodes of a corresponding one of the belt edge detecting LED devices 3a to 3d and detects the position of the edge of the photo receptor belt 1 based on by which ones of the CCDs the light beams can be received.

In particular, when the exposure laser beams 24a to 24d are irradiated upon the BD signal generation elements 23a to 23d immediately before the exposure laser beams 24a to 24d are scanned on the photo receptor belt 1, the BD signal generation elements 23a to 23d output BD signals 106 representative of starting of scanning. The LED compulsory light emission section 36 receives the BD signals 106 and causes the belt edge detecting LED devices 3a to 3d to emit light.

When the CCD sensors 41a to 41d receives the LED light 108, the belt position detection section 42 detects the received portions of the LED light 108 by the CCD sensors 41a to 41d to detect the positions of the edge of the photo receptor belt 1 and outputs trigger signals 110 synchronized with the detection timings. In order to adjust the writing positions on the photo receptor belt 1 with a high degree of accuracy, the synchronization clock generator 32 synchronizes an asynchronous clock signal outputted from the clock generation section 31 with falling edges of the trigger signals 110 to produce video clock signals 103 and outputs the video clock signals 103. Simultaneously, the main scanning direction synchronization signal generation section 33 counts the numbers of clocks of the video clock signals 103 using counters and output main scanning direction synchronization signals 102 after an arbitrary interval of time ($t_1$ seconds) set by the CPU 34 from the falling edges of the trigger signals 110.

Video data stored in the video signal generation section 35 are outputted as video signals 104 from the video signal generation section 35 in synchronism with the video clock signals 103 after $t_2$ seconds from falling edges of the main scanning direction synchronization signals 102. When the video signals 104 are received, the laser driver 37 causes the laser diodes 21a to 21d to emit light in response to laser ON signals 105 so that the photo receptor belt 1 is exposed to the light emitted from the laser diodes 21a to 21d to form electrostatic latent images thereon.

While a preferred embodiment of the present invention has been described using specific terms, such description is for illustrative purposes only, and it is to be understood that changes and variations may be made without departing from the spirit or scope of the following claims.

What is claimed is:

1. A method for forming a latent image on a photo receptor belt having a photosensitive side and a substrate side, by repeatedly scanning the photosensitive side in a first direction along a scan path with a laser beam modulated in accordance with image data, the photo receptor belt moving continuously in a direction substantially transverse to the scan path, but also being subject to unwanted movement along the scan path, the method comprising the steps of:

generating a first clock signal;

generating a reference signal during each laser beam scan when the laser beam reaches a predetermined position along the scan path;

electronically compensating for unwanted movement of the belt along the scan path without repositioning the belt, the compensation process being comprised of:

establishing an edge detection interval during each laser beam scan in response to generation of the reference signal;

illuminating an extension of the scan path at one edge of the photo receptor belt by a plurality of spaced illuminators positioned on one side of the belt, the illuminators being so positioned along the extension of the scanning path that, when there has been no substantial movement of the belt along the scan path, the light paths from a first group of the illuminators intercept the belt, and the light paths from a second group of the illuminators do not intercept the belt, but pass beyond the one edge thereof;

each illuminator being activated in succession during each edge detection interval in synchronism with the first clock signal;

positioning a plurality of light detectors on the side of the photo receptor belt opposite the plurality of illuminators, each of the light detectors being respectively aligned with the light path of one of the illuminators;

generating an edge detection signal when the light path of an activated illuminator at the edge of the belt is not detected by an associated detector;

synchronizing the first clock signal to the edge detection signal as a second clock signal; and identifying the passage of a predetermined time delay following generation of the edge detection signal; and modulating the laser beam in accordance with the second clock signal and image data; and permitting modulation of the laser beam in accordance with the image data to begin only after passage of the predetermined time delay, thereby assuring that each scan cycle begins with the laser beam at the same position along the scan path.

2. The method as described in claim 1, wherein the edge detection interval begins a predetermined time after generation of the reference signal.

3. The method as described in claim 1, wherein the second clock signal is a series of pulses at the frequency of the first clock signal generated in a predetermined phase relationship with the edge detection signal.

4. The method as described in claim 1, wherein the latent image is comprised of a plurality of color separation images; wherein the method is further comprised of:

forming each of the color separation images by repeatedly scanning the photosensitive side of the photo receptor belt with separate laser beams modulated in accordance with image data for the color separation images; wherein the step of compensating for unwanted movement is further comprised of:

generating separate reference signals for each scan cycle of each laser beam when the laser beam reaches a predetermined position along its scan path;

establishing separate edge detection intervals for each scan cycle in response to generation of the respective reference signals;

illuminating the extensions of the scan paths with a separate array of illuminators for each color separation image during the respective edge detection intervals;

positioning the arrays of illuminators and respectively aligned light detectors in spaced relationship along the direction of travel of the belt in accordance with the spacing between the color separation images;

generating separate edge detection signals from each illuminator array;

synchronizing the first clock signal to each edge detection signal as a separate second clock signal for each color separation image; and identifying passage of a predetermined time delay following generation of each edge detection signal; and wherein the method is further comprised of:

modulating the laser beam associated with each color separation image in accordance with the respective second clock signals and image data; and permitting modulation of the laser beam associated with each color separation image to begin only after passage of the predetermined time delay associated with the edge detection signal for that color separation image.

5. The method as described in claim 1, wherein the illuminators are activated beginning with the illuminator in the second group which is furthest from the edge of the belt.

6. An apparatus for forming a latent image on a photo receptor belt having a photosensitive side and a substrate side, by scanning the photosensitive side of the belt in a first direction along a scan path with a laser beam modulated in accordance with image data, the photo receptor belt moving continuously in a direction transverse to the scan path, but also being subject to unwanted movement along the scan path, the apparatus comprising:

an emitter which produces a laser beam;

a driver connected to the emitter to modulate the beam in accordance with image data;

a scanner which directs the laser beam across the photosensitive surface of the photo receptor belt along the scan path;

a first clock signal generator;

a beam detector located in the scan path of the laser beam which produces a reference signal during each laser beam scan when it detects passage of the laser beam;

an electronic belt movement compensator which assures that each scan modulation cycle begins with the laser beam at the same position along the scan path, without repositioning the belt to compensate for unwanted movement in the scan direction, the compensator being comprised of:

a timer responsive to the reference signal which generates a signal defining a predetermined edge detection interval;

a plurality of illuminators positioned on one side of the photo receptor belt in spaced relationship along an extension of the scan path, the illuminators being so positioned along the extension of the scanning path that when there has been no substantial movement of the belt along the scan path, the light paths from a first group of the illuminators intercept the belt, and the light paths from a second group of the illuminators do not intercept the belt, but pass beyond the one edge thereof;

a plurality of light detectors positioned on the side of photo receptor belt opposite the plurality of illuminators, each of the light detectors being aligned respectively with the light path of one of the illuminators, a driver circuit connected to the first clock signal generator and to the timing circuit which activates each of the illuminators in turn, in synchronism with the output of the first clock signal generator during the edge detection interval;

an edge detection signal generating circuit connected to the light detectors which generates an edge detection signal during the edge detection interval indicating that light from an activated illuminator has not been detected by an associated detector;

a second clock signal generator connected to the first clock signal generator and to the edge detection circuit which synchronizes the first clock signal with the edge detection signal as a second clock signal;

a scanning synchronization signal generator connected to the second clock signal generator and the edge detection signal generating circuit which generates a scanning synchronization signal at a predetermined time after generation of the edge detection signal; and an image signal generator responsive to the second clock signal and the scanning synchronization signal to provide an image signal to the driver for modulating the laser beam.

7. An apparatus as described in claim 6, wherein one of the illuminators positioned most remotely from the edge of the belt when there has been no substantial unwanted transverse movement of the belt is activated first during each edge detection interval.

8. An apparatus as described in claim 6, wherein the illuminator in the second group positioned most remotely from the edge of the belt is activated first during each edge detection interval.

9. An apparatus as described in claim 8, wherein the edge detection signal is generated from the time the first illuminator is activated until the light path of an activated illuminator is obstructed by the belt.

10. An apparatus as described in claim 6, wherein each of the light detectors is a CCD.

11. An apparatus as described in claim 6, wherein each of the light detectors is a photodiode.

12. An apparatus as described in claim 6, wherein each of the illuminators is a light emitting diode.

13. An apparatus as described in claim 6, wherein the second clock signal is in the form of a series of pulses, in a predetermined phase relation with the edge detection signal.

14. An apparatus as described in claim 6, wherein the edge detection interval begins a predetermined time following generation of the reference signal.

15. An apparatus as described in claim 6, wherein the latent image is comprised of a plurality of color separation images; wherein the apparatus is further comprised of separate emitters, drivers and scanners to produce separate modulated laser beams for each color separation image;

a beam detector located in the scanning path of each of the laser beams which produces a reference signal during each laser beam scan when it detects passage of the laser beam;

wherein the transverse belt movement compensator is further comprised of:

a plurality of illuminators for each color separation image, and a plurality of light detectors respectively aligned with the illuminators, and positioned on the opposite side of the photo receptor belt from the illuminators in spaced relationship along extensions of the scanning path, the illuminators and the aligned light sensors for each color separation image being divided into first and second groups;

the respective first and second groups for each color separation image being so positioned that, when there has been no substantial unwanted movement of the belt along the scan path, the light paths from the first groups of illuminators to the respective aligned light detectors are obstructed by the belt, and the light paths from the second groups of illuminators to the respective aligned light detectors are not obstructed by the belt;

a driver circuit which activates the illuminators associated with each of the color separation images in turn, in synchronism with the output of the first clock signal generator, during the respective edge detection intervals;

a belt edge detection circuit for each color separation image;

a second clock signal generator for each color separation image connected to the first clock signal generator and to the associated edge detector;

a scanning synchronization signal generator for each color separation image responsive to the second clock signals and the associated edge detection signals which generates a scanning synchronization signal for each color separation image at a predetermined time after generation of the associated edge detection signal; and wherein the apparatus is further comprised of:

an image signal generator for each color separation image which responds to the second clock signals and the associated scanning synchronization signal to provide image signals to each of the emitter drivers.

* * * * *